US012812612B2

(12) United States Patent
Awad et al.

(10) Patent No.: US 12,812,612 B2
(45) Date of Patent: Nov. 24, 2026

(54) COMMUNICATIONS DEVICE, INFRASTRUCTURE EQUIPMENT AND METHODS

(71) Applicant: Sony Group Corporation, Tokyo (JP)

(72) Inventors: Yassin Aden Awad, Stuttgart (DE); Vivek Sharma, Stuttgart (DE); Yuxin Wei, Stuttgart (DE); Hideji Wakabayashi, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 678 days.

(21) Appl. No.: 17/792,413

(22) PCT Filed: Jan. 18, 2021

(86) PCT No.: PCT/EP2021/050919

§ 371 (c)(1),
(2) Date: Jul. 13, 2022

(87) PCT Pub. No.: WO2021/151704

PCT Pub. Date: Aug. 5, 2021

(65) Prior Publication Data

US 2023/0058594 A1 Feb. 23, 2023

(30) Foreign Application Priority Data

Jan. 31, 2020 (EP) .................................... 20155023

(51) Int. Cl.
*H04W 72/0453* (2023.01)
*H04W 72/12* (2023.01)
(Continued)

(52) U.S. Cl.
CPC ....... *H04W 72/0453* (2013.01); *H04W 72/12* (2013.01); *H04W 72/1273* (2013.01); *H04W 72/23* (2023.01); *H04W 72/30* (2023.01)

(58) Field of Classification Search
CPC . H04W 72/0453; H04W 72/23; H04W 72/12; H04W 72/30; H04W 72/51; H04W 4/06; H04L 5/0091
See application file for complete search history.

(56) References Cited

U.S. PATENT DOCUMENTS

2017/0230434 A1* 8/2017 Wang .................... H04L 65/765
2018/0234807 A1* 8/2018 Park ...................... H04W 72/51
(Continued)

FOREIGN PATENT DOCUMENTS

WO 2019/170039 A1 9/2019
WO 2019/216740 A1 11/2019

OTHER PUBLICATIONS

U.S. Appl. No. 62/959,741, filed Jan. 10, 2020, Chen et al: US Provisional.*

(Continued)

*Primary Examiner* — Omer S Mian
(74) *Attorney, Agent, or Firm* — XSENSUS LLP

(57) ABSTRACT

A method of requesting, by a communications device, the provision of a first service and a second service in a wireless communications network, the method comprising transmitting to an infrastructure equipment of the wireless communications network a service preference indication (SPI), the SPI requesting the infrastructure equipment to provide to the communications device the first service and the second service in accordance with a bandwidth parts capability of the communications device, wherein in accordance with the bandwidth parts capability, the communications device is unable to receive and decode first data transmitted using a first bandwidth part of a carrier bandwidth of a wireless access interface provided by the infrastructure and second (Continued)

data transmitted using a second bandwidth part of the carrier bandwidth, if the first data and the second data are transmitted simultaneously.

19 Claims, 6 Drawing Sheets

(51) Int. Cl.

| | |
|---|---|
| ***H04W 72/1273*** | (2023.01) |
| ***H04W 72/23*** | (2023.01) |
| ***H04W 72/30*** | (2023.01) |

(56) References Cited

U.S. PATENT DOCUMENTS

| | | | | |
|---|---|---|---|---|
| 2019/0254110 | A1 | 8/2019 | He et al. | |
| 2023/0040690 | A1* | 2/2023 | Chen | H04L 5/0053 |
| 2023/0309122 | A1* | 9/2023 | Takeda | H04W 76/27 |

OTHER PUBLICATIONS

U.S. Appl. No. 62/927,031, filed Oct. 28, 2019, Takeda et al: US Provisional.*

International Search Report and Written Opinion mailed on Apr. 9, 2021, received for PCT Application PCT/EP2021/050919, filed on Jan. 18, 2021, 10 pages.

Mediatek Inc., "Summary of Bandwidth Part Operation", 3GPP TSG RAN WG1 Meeting 90bis, R1-1718901, Oct. 9-13, 2017, 14 pages.

3GPP, "NR; Medium Access Control (MAC) protocol specification (Release 15)", 3GPP TS 38.321 V15.3.0, Sep. 2018, pp. 1-76.

Holma et al., "LTE for UMTS OFDMA and SC-FDMA based radio access", John Wiley and Sons, 2009, 232 pages.

Nokia et al., "Revised SID: Study on NR Industrial Internet of Things (IoT)", 3GPP TSG RAN meeting #81, RP-182090, Sep. 10-13, 2018, 5 pages.

Qualcomm Inc., "Revised WID on NR-based Access to Unlicensed Spectrum", 3GPP TSG RAN Meeting #84, RP-191575, Jun. 3-6, 2019, 8 pages.

Nokia et al., "Revised WID: Support of NR Industrial Internet of Things (IoT)", 3GPP TSG RAN Meeting #85, RP-192324, Sep. 16-20, 2019, 6 pages.

ZTE Corporation, "Revised work item proposal: 2-step RACH for NR", 3GPP TSG RAN Meeting #85,RP-192330, Sep. 16-20, 2019, 4 pages.

Huawei et al., "New Work Item on NR support of Multicast and Broadcast Services", 3GPP TSG RAN Meeting #86, RP-193163, Dec. 9-12, 2019, 5 pages.

ZTE Corporation, "Work Item on NR smalldata transmissions in Inactive state", 3GPP TSG RAN Meeting #86, RP-193252, Dec. 9-12, 2019, 4 pages.

* cited by examiner

COMMUNICATIONS DEVICE, INFRASTRUCTURE EQUIPMENT AND METHODS

CROSS-REFERENCE TO RELATED APPLICATIONS

The present application is based on PCT filing PCT/EP2021/050919, filed Jan. 18, 2021, which claims priority to EP 20155023.3, filed Jan. 31, 2020, the entire contents of each are incorporated herein by reference.

BACKGROUND

Field

The present disclosure relates to communications devices, infrastructure equipment and methods for the provision of services in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

An example of such a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of communications devices associated with different traffic profiles gives rise to new challenges for efficiently handling communications in wireless telecommunications systems that need to be addressed.

SUMMARY

The present disclosure can help address or mitigate at least some of the issues discussed above.

Embodiments of the present technique can provide a method of requesting, by a communications device, the provision of a first service and a second service in a wireless communications network, the method comprising transmitting to an infrastructure equipment of the wireless communications network a service preference indication (SPI), the SPI requesting the infrastructure equipment to provide to the communications device the first service and the second service in accordance with a bandwidth parts capability of the communications device, wherein in accordance with the bandwidth parts capability, the communications device is unable to receive and decode first data transmitted using a first bandwidth part of a carrier bandwidth of a wireless access interface provided by the infrastructure and second data transmitted using a second bandwidth part of the carrier bandwidth, if the first data and the second data are transmitted simultaneously.

Embodiments can therefore provide methods in which one or more communications devices can request the provision of services in a wireless communications network in which a carrier bandwidth is configured in a plurality of bandwidth parts.

In accordance with some embodiments of the present technique a communications device is able to request a multicast or broadcast service and a unicast service which are provided on different bandwidth parts.

Embodiments of the present technique can also provide a method for transmitting data associated with a first and second service using respective bandwidth parts of a carrier bandwidth, in accordance with capabilities of a communications device. A communications device is able thereby obtain a first service (which may be a unicast service) and a second service (which may be a multicast or broadcast service) which are provided on different bandwidth parts, in accordance with its capabilities to operate using the different bandwidth parts.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
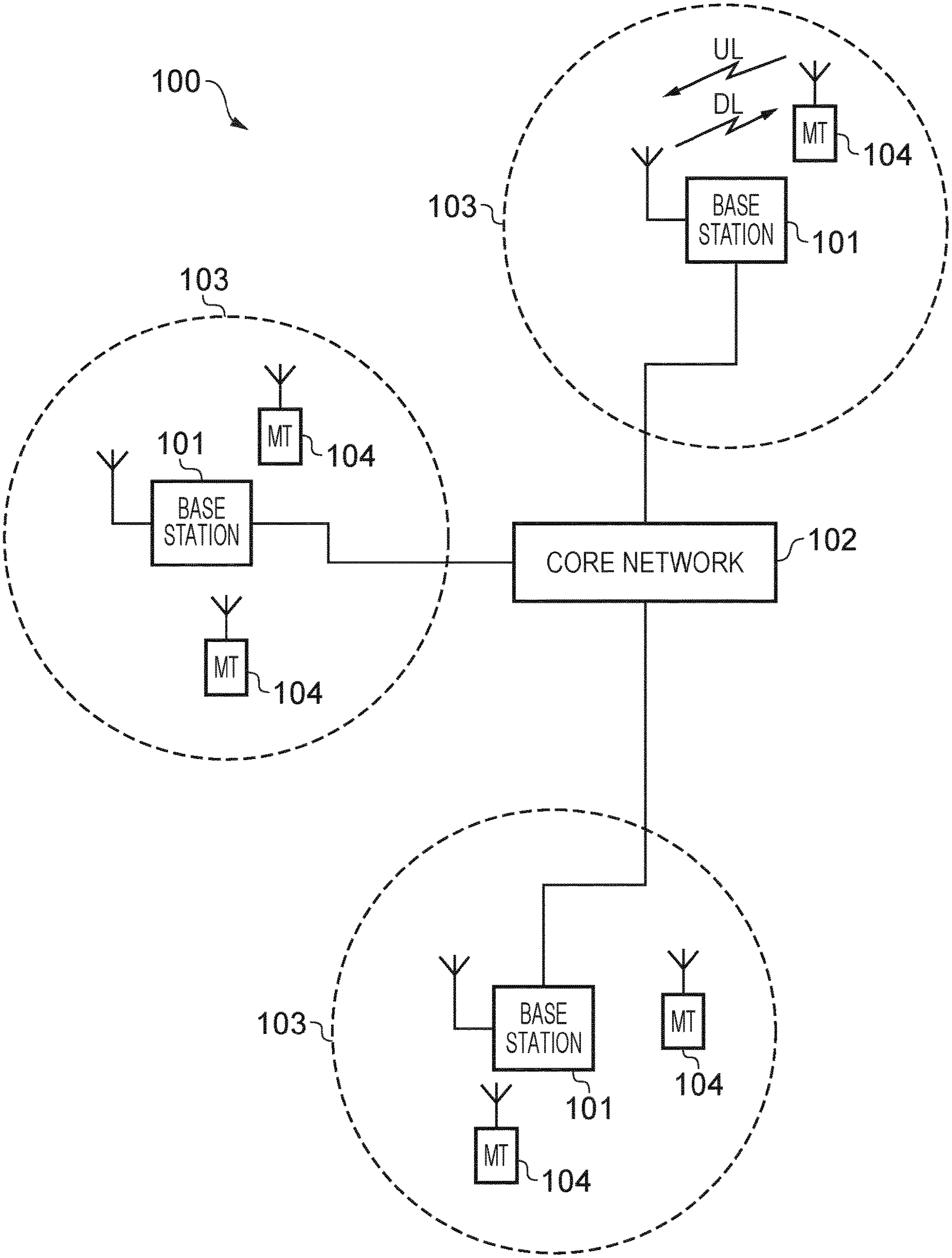
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
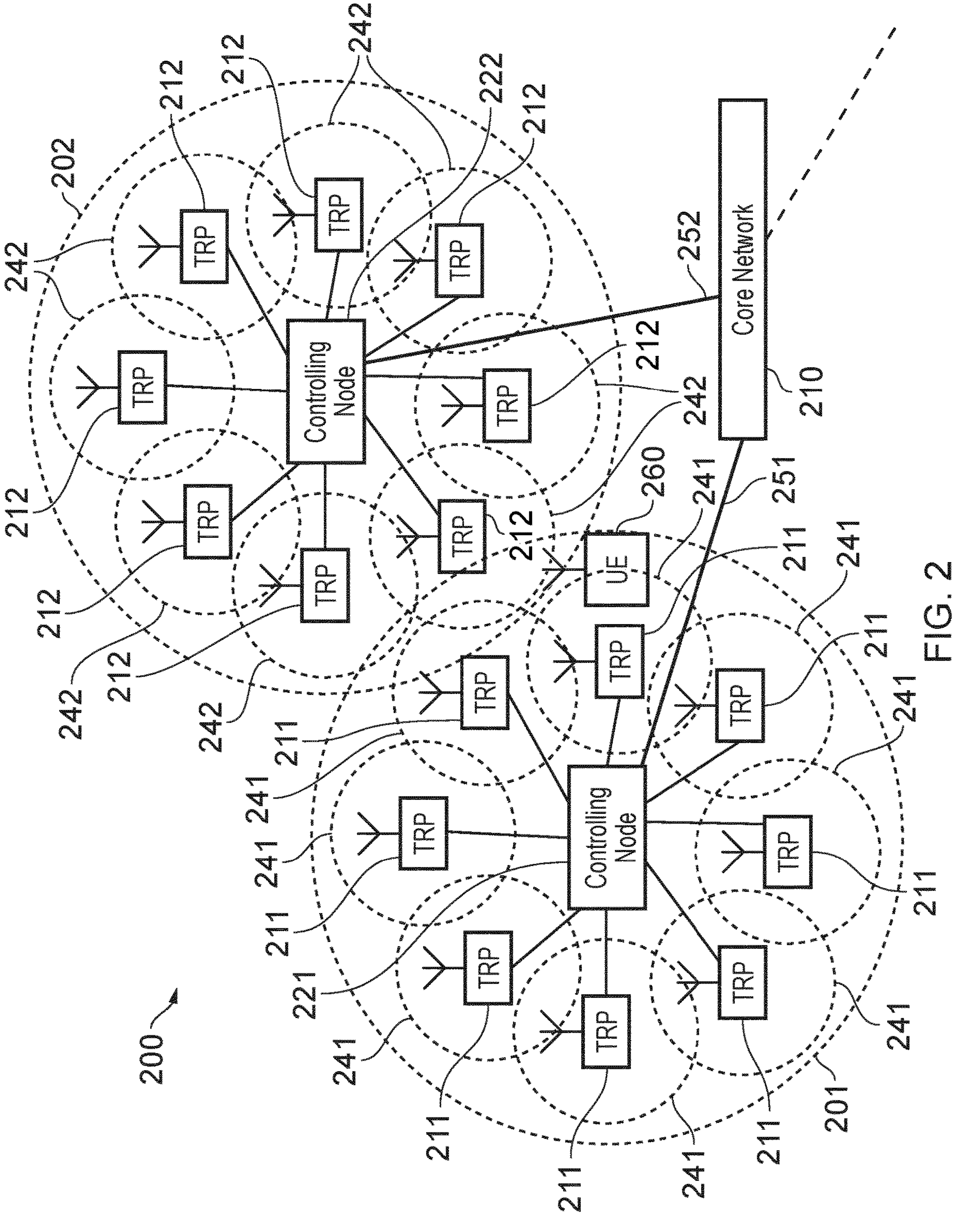
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated that in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated that the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
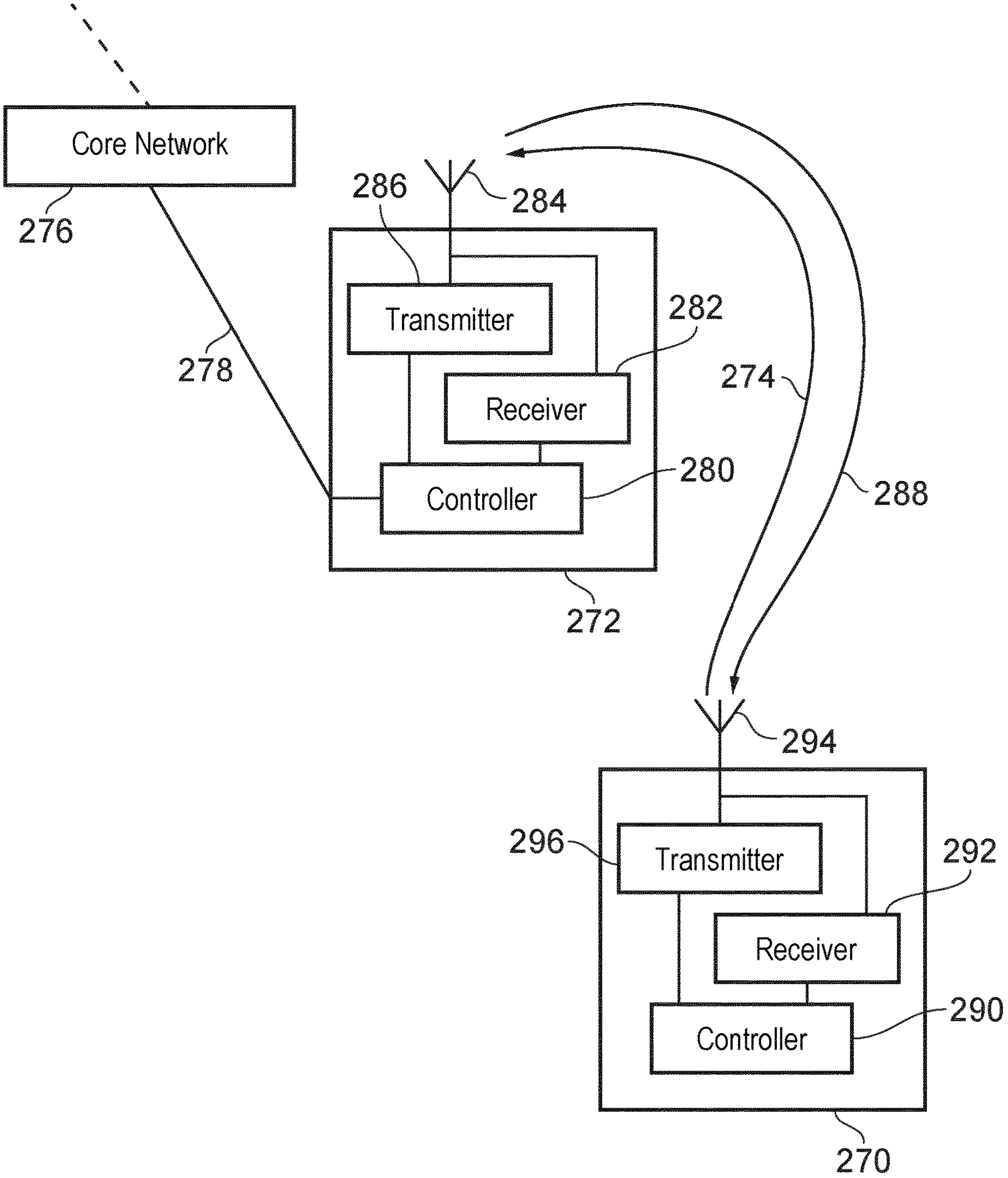
FIG. 3 is a schematic block diagram of an example infrastructure equipment and communications device which may be configured in accordance with example embodiments.

A more detailed illustration of a UE/communications device 270 (which may correspond to a communications device such as the communications device 260 of FIG. 2 or the communications device 270 of FIG. 1) and an example network infrastructure equipment 272, which may be thought of as a gNB 101 or a combination of a controlling node 221 and TRP 211, is presented in FIG. 3. As shown in FIG. 3, the UE 270 is shown to transmit uplink data to the infrastructure equipment 272 via uplink resources of a wireless access interface as illustrated generally by an arrow 274 from the UE 270 to the infrastructure equipment 272. The UE 270 may similarly be configured to receive downlink data transmitted by the infrastructure equipment 272 via downlink resources as indicated by an arrow 288 from the infrastructure equipment 272 to the UE 270. As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284.

Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

Bandwidth Parts (BWP)

A communications device, such as the communications device/mobile terminal 104 of FIG. 1, the communications device/UE 260 of FIG. 2, or the communications device 270 of FIG. 3 is configured to communicate via a wireless access interface. The communications is with an infrastructure equipment, such as the infrastructure equipment/base station 101 of FIG. 1, infrastructure equipment (TRP) 211, 212 of FIG. 2, or infrastructure equipment 272 of FIG. 3.

In the following description, reference will be made to the communications device 270 of FIG. 3 and infrastructure equipment 272 of FIG. 3, merely for conciseness.

The wireless access interface may comprise one or more carriers, each providing, within a range of carrier frequencies, communications resources for transmitting and receiving signals according to a configuration of the wireless access interface. The one or more carriers may be configured within a system bandwidth provided for the wireless communications network of which the infrastructure equipment 272 forms part. Each of the carriers may be divided in a frequency division duplex scheme into an uplink portion and a downlink portion and may comprise one or more bandwidth parts (BWPs).

A carrier may be configured therefore with a plurality of different BWP for a communications device to transmit or receive signals. The nature of the wireless access interface may be different amongst the different BWPs. For example, where the wireless access interface is based on orthogonal frequency division multiplexing, different BWPs may have different sub-carrier spacing, symbol periods and/or cyclic prefix lengths. BWPs may have different bandwidths.

By configuring BWPs appropriately, the infrastructure equipment may provide BWPs which are suited for different types of services. For example, a BWP more suitable for eMBB may have a larger bandwidth in order to support high data rates. A BWP suited for URLLC services may use a higher sub-carrier spacing and shorter slot durations, in order to permit lower latency transmissions. Parameters of the wireless access interface which are applicable to a BWP may be referred to collectively as the numerology of a BWP. Examples of such parameters are sub-carrier spacing, symbol and slot durations and cyclic prefix length.

A BWP may comprise communications resources for uplink (UL) and/or downlink (DL) communications. In some examples uplink and downlink communications resources are separated in frequency, in which case frequency division duplexing (FDD) may be used. Where FDD is used, a UL BWP and a DL BWP may comprise two non-contiguous frequency ranges, one comprising communications resources for uplink communications and one comprising communications resources for downlink communications.

In some examples, a bandwidth part may comprise uplink and downlink communications resources separated in time, in which case time division duplexing (TDD) may be used.

In the remainder of the present disclosure, the term ‘bandwidth part’ (BWP) is used to refer to a pair of associated uplink and downlink bandwidth parts operating using FDD, or a single BWP operating using TDD. As such, a bandwidth part may comprise communications resources for both uplink and downlink transmissions. The terms ‘uplink bandwidth part’ and ‘downlink bandwidth part’ will be used where appropriate to refer to a bandwidth part comprising only, respectively, uplink communications resources and downlink communications resources.

A communications device may be configured with one or more BWPs. The configuration may be by means of, for example, RRC signalling, the signalling indicating the frequency range and numerology of the BWP. A BWP may remain configured irrespective of radio resource control (RRC) state changes. Accordingly, for example, configured BWPs may remain configured even if the RRC state changes from a connected mode to an idle mode.

A configured BWP may be either an activated BWP or a deactivated BWP. An activated BWP refers to a BWP which may be used for the transmission or reception of data to or from the communications device 270. The infrastructure equipment 272 may schedule transmissions to or by the communications device only on a BWP if that BWP is currently activated for the communications device. On deactivated BWPs, the communications device is not required to monitor any control channel (such as a PDCCH) and is not required to transmit on any uplink communications resources (such as associated with a PUCCH, a PRACH or UL-SCH).

Conventionally at most one BWP may be activated at any given time in respect of a particular communications device.

In light of the differing parameters which may be applicable to BWPs, a single activated BWP may not be suitable for the transmission of data associated with different services, if those different services have different requirements (e.g. latency requirements) or characteristics (e.g. bandwidth/data rate).

A configured BWP may be designated as a default BWP. A default BWP is one that a UE falls back to when an inactivity timer, associated with a BWP other than the default BWP, expires. For example, where a non-default BWP is deactivated as a result of an associated inactivity timer expiring, and no other non-default BWP is activated, then a default BWP may be activated in response. A default BWP may have an activation or deactivation priority which differs from the activation or deactivation priority of other, non-default, BWPs. A default BWP may be preferentially activated and/or may be deactivated with lowest preference. For example, a default BWP may remain activated unless and until a further BWP is to be activated such that a maximum number of activated BWPs would be exceeded. A default BWP may further be preferentially used for transmitting an indication that a different BWP is to be activated or de-activated.

Figure 4:
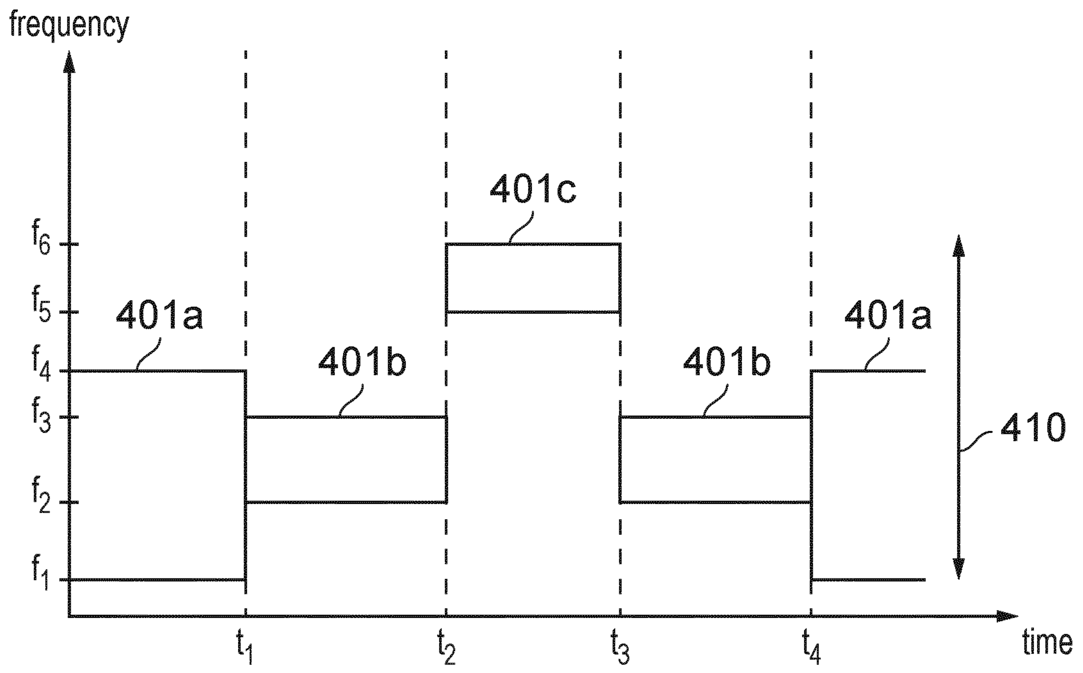
FIG. 4 illustrates an example of an arrangement of bandwidth parts within a carrier of a wireless communications network.

FIG. 4 shows an example of first to third downlink BWPs 401*a-c* configured within a downlink portion of a system bandwidth 410 extending from frequency f1 to frequency f6. The system bandwidth 410 may also be referred to as a carrier bandwidth. The following Table 1 provides a summary of the characteristics of each of the BWPs 401*a-c*:

TABLE 1

Summary of BWP characteristics

| BWP | Index (bwp-id) | Frequency range | Sub-carrier spacing |
|---|---|---|---|
| 401a | 1 | f1-f4 | 15 kHz |
| 401b | 2 | f2-f3 | 15 kHz |
| 401c | 3 | f5-f6 | 60 kHz |

As shown in Table 1, each BWP may be identified by an index number (bwp-id).

In the example in FIG. 3, the BWPs 401*a-c* do not collectively span the entire downlink portion of the system bandwidth 410. However, in some examples, the frequency range of one or more BWPs collectively span the system bandwidth (in other words, all frequencies in the system bandwidth may fall within at least one BWP). A frequency range of a BWP may be entirely within the frequency range of another BWP (in this case, the second BWP 401*b* is within the bandwidth of the first BWP 401*a*).

In some embodiments of the present technique, the system bandwidth 410 may be identified by a cell identifier, and all BWPs configured within the same system bandwidth 410 accordingly are associated with the same cell identifier.

In some embodiments, a first BWP of the system bandwidth 410 may be used for the transmission of system information and broadcast control information (such as a multicast control channel, MCCH).

Certain principles which may be applicable to the operation bandwidth parts in embodiments of the present technique are set out in [4].

Multicast/Broadcast Services

Many Services Provided to Wireless Communications Devices are Unicast Services. With a Unicast Service, only a single communications device receives the service, which may be a voice call, a data transfer, or the use of a point-to-point messaging service.

A multicast and broadcast service (MBS) allows multiple devices to receive the same service, simultaneously. An example of a multicast service is a group voice call, in which the same voice content is received simultaneously by multiple communications devices within a particular group. An example of a broadcast service is a streaming service, such as an audio or video broadcast, which can be received and decoded, simultaneously, by all capable communications devices within a particular coverage area.

Receiving (or providing) a service in this context may comprise the use of uplink transmissions, downlink transmissions or both. The provision of an MBS may be exclusively by means of downlink transmissions, although in some examples, a communications device receiving the MBS may be required to transmit information in the uplink, for example relating to feedback and/or measurement reports.

In the present description, the terms unicast, broadcast and multicast are used in the context of a particular wireless communications network, or a portion thereof (such as a single cell). Thus, for example, when a single user in a cell accesses a streaming service from a third party server outside of the wireless communications network, this may be considered to be (for the present purposes) a unicast service, even though the third party server may permit simultaneous access to multiple devices (even within the same cell) by means of multiple respective connections which are, from the perspective of the wireless communications network, unicast connections. The terms multicast and broadcast as used herein therefore may relate to the case where it is the radio access network and/or core network of the wireless communications network which enable the reception of the service by two or more devices simultaneously.

Multicast/Broadcast services thus can efficiently provide the same service to multiple users within the wireless communications network, by using fewer communications resources (on a wireless access network and/or on internal connections within the wireless communications network) than would be required to provide the same service to multiple users by means of unicast connections.

Multiple MBS services may be available at a given time. In order to conserve communications resources, data associated with an MBS service may be transmitted in a cell only if the corresponding infrastructure equipment 272 is aware of at least one communications device 270 in the cell which is configured to attempt to receive and decode the data associated with the MBS service. A communications device may be configured as such based on a user interaction, a pre-configuration or by any other means.

It is generally desirable that a communications device be capable of receiving one or more unicast services in parallel with receiving an MBS. For example, a user of a communications device may wish to receive a live audio stream which is being broadcast, while using a messaging service via a unicast data connection.

However, infrastructure equipment in a wireless communications network may schedule transmissions associated with the MBS on a BWP which is different from the one on which the communications device is receiving the unicast service. Moreover, depending on the receiver capabilities of the communications device, it may not, in such circumstances, be possible for the communications device to receive data associated with both services simultaneously.

There is thus a need to provide a communications device, infrastructure equipment, and methods therefore to overcome this problem.

Embodiments of the present technique provide a method of requesting, by a communications device, the provision of a first service and a second service in a wireless communications network, the method comprising transmitting to an infrastructure equipment of the wireless communications network a service preference indication (SPI), the SPI requesting the infrastructure equipment to provide to the communications device the first service and the second service in accordance with a bandwidth parts capability of the communications device, wherein in accordance with the bandwidth parts capability, the communications device is unable to receive and decode first data transmitted using a first bandwidth part of a carrier bandwidth of a wireless access interface provided by the infrastructure and second data transmitted using a second bandwidth part of the carrier bandwidth, if the first data and the second data are transmitted simultaneously.

In examples according to the present technique, one or more of the following may be used to address the above problem:

- an initial service preference indication (SPI) transmitted by a communications device indicating to an infrastructure equipment that it wishes to obtain two services, such as an MBS service and a unicast service;
- determination, by an infrastructure equipment, of the capabilities of the communications device with respect to its ability to receive simultaneous downlink transmissions on two different BWPs;
- based on these capabilities, scheduling, by the infrastructure equipment, of transmissions associated with the requested service in a manner which allows the communications device to receive both;
- where the downlink transmissions associated with the requested services are on different BWPs, controlling a receiver of the communications device to receive signals on the BWPs alternately such that the downlink transmissions associated with both the requested services can be received.

Examples of the present technique therefore provide for a communications device to receive both, for example, an MBS service and a unicast service in a wireless communications network in which a carrier bandwidth is sub-divided into different bandwidth parts. In some examples, the MBS service and unicast service are provided using communications resources of different BWPs. In some examples, the bandwidth parts used for providing the MBS service and unicast service operate according to a different numerology.

Figure 5:
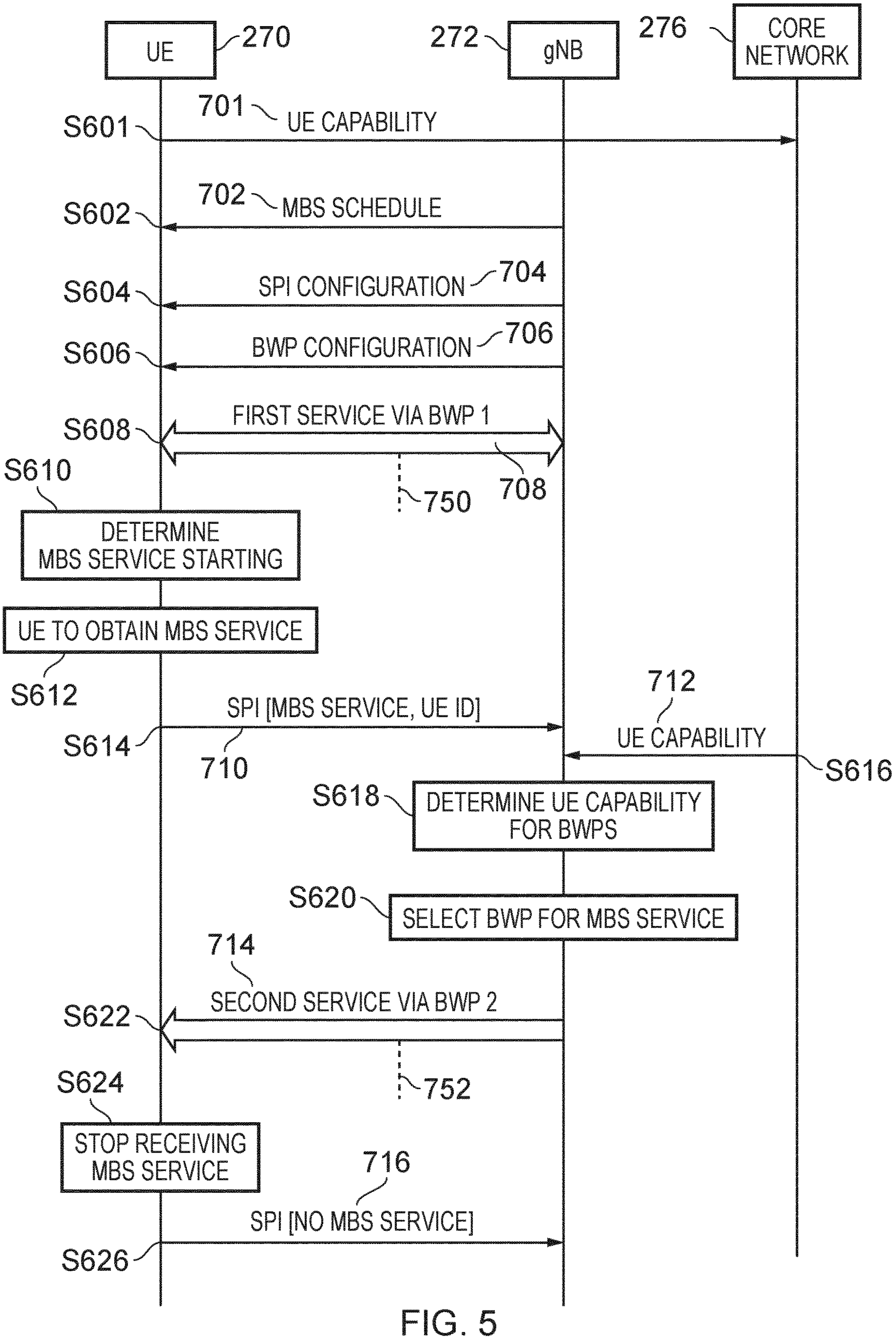
FIG. 5 is a combined message sequence chart/process flow diagram in accordance with embodiments of the present technique.

FIG. 5 is a combined message sequence chart/process flow diagram illustrating aspects of the present technique. FIG. 5 shows a sequence of transmissions and process steps carried out by one or other of a communications device (or UE) 270 an infrastructure equipment (or gNB) 272 and a core network part 276, which may correspond respectively to the communications device 270, infrastructure equipment 272 and core network 276 of FIG. 3.

Initially, the communications device 270 is within a cell controlled by the infrastructure equipment 272. Accordingly, the cell is the serving cell for the communications device 270.

At step S601, the communications device 270 transmits to the core network 276 a capability indication 701, the capability indication 701 indicating a bandwidth parts (BWP) capability. The BWP capability specifies the ability of the communications device 270 to operate using two BWPs simultaneously. According to some embodiments of the present technique, a communications device may be capable of 'operating using two BWPs simultaneously' if it is able to receive and/or transmit data transmitted using resources which are allocated on one BWP, when the allocation of the resources on that BWP is independent of, i.e. without regards to, any allocation of resources on the other BWP for the transmission or reception of data to or by the communications device. The BWP capability may define one or more of:

- whether the communications device is capable of operating on two BWPs simultaneously i) when they share a common numerology and/or ii) when their numerology differs. For example, it may indicate that the communications device is unable to operate on two BWPs simultaneously if their respective sub-carrier spacing is different; and/or
- whether it is necessary for there to be a gap (e.g. guard band) in the frequency domain, separating the two BWPs and if so, a minimum size of the gap, for the communications device to be able to operate on two BWPs simultaneously, when the two BWPs have different numerology such that the subcarriers of the two BWPs are not orthogonal; and/or
- a switching time required by the communications device to switch operation from one BWP to a different BWP if the communications device cannot operate on the two BWPs simultaneously.

The BWP capability may be based on the receiver architecture (including whether two receive chains are available), an ability of the communications device 270 to successfully mitigate inter-carrier interference (ICI), or on any other factors.

In general, the BWP capability may permit the wireless communications network to determine, for any pair of BWPs, whether or not the communications device 270 is capable of operating using the BWPs simultaneously. In some example techniques, the BWP capability provides an indication for transmit operations and receive operations. For example, the BWP capability may indicate that the communications device 270 is capable of performing receive operations using two different BWPs simultaneously if certain criteria are met and that communications device 270 is incapable of transmitting using resources of two different BWPs simultaneously, irrespective of their respective parameters.

At step S602, the communications device 270 receives an MBS schedule 702, indicating that one or more MBS services will be available and indicating starting times of one or more of the MBS services. The MBS schedule 702 is transmitted by the infrastructure equipment 272 and in some examples is transmitted in response to the infrastructure equipment 272 receiving (not shown) MBS schedule information from the core network 102. In some examples, the MBS schedule information is received from the core network 102 and forwarded transparently by the infrastructure equipment 272 as the MBS schedule 702.

In some embodiments, the MBS schedule 702 may comprise an indication that one or more MBS services are now available in the cell. In some embodiments, the MBS schedule 702 may be indicated within an MBS system information block (SIB). The transmission of the MBS schedule 702, indicating one or more MBS services, may implicitly indicate that the indicated MBS services are now available in the cell.

At step S604, the communications device 270 receives a service preference indication (SPI) configuration indication 704. As further described below, in some examples of the present technique, the communications device 270 transmits an SPI to the infrastructure equipment 272. In some embodiments, the SPI configuration indication 704 indicates the conditions in which the communications device 270 is to transmit the SPI.

In some embodiments, the MBS schedule 702 comprises the SPI configuration indication 704 and/or the MBS SIB may comprise the SPI configuration indication 704. In some embodiments, the SPI configuration indication 704 may be implicit in the MBS schedule 702.

In some embodiments, one or more conditions for transmitting the SPI may be specified in standards.

At step S606, the infrastructure equipment 272 transmits a BWP configuration indication 706 to the communications device 270. The BWP configuration indication 706 may indicate the frequency ranges and numerology applicable to one or more BWPs. In the example of FIG. 5, the BWP configuration indication 706 indicates that at least a first BWP, BWP1 and a second BWP, BWP2 are configured for the communications device 270.

In some embodiments, one or both of the first BWP and second BWP are also used for the transmission of broadcast control information for the cell. The broadcast control information may comprise system information and/or a multicast control channel. In some embodiments, broadcast information relating to the cell in general (such as system information) is transmitted on communications resources whose frequencies are not with the range of either the first BWP or the second BWP. In some embodiments, broadcast information relating to services currently, or scheduled to be available the cell (such as the second service) may be transmitted on communications resources whose frequencies are not with the range of either the first BWP or the second BWP and in some embodiments, are transmitted on the same BWP as that in which system information is transmitted.

Subsequently, at step S608, the communications device 270 receives a first service 708 by means of transmissions using the first BWP, BWP1. The first service may be a unicast service, such as a data transfer, interactive service (e.g. web browsing), or voice call. Generally, the first service may be one where communications resources used to transmit and/or receive the associated data (which may include voice data) are allocated solely for the use of the communications device 270, and not for any other communications device 270 which may be in the same cell.

In some embodiments, the infrastructure equipment 272 allocates communications resources on a wireless access interface of the cell for the transmission of data associated with the first service. The data may be transmitted in response to receipt of downlink data from the core network 102, requests or indications (e.g. buffer status reports) from the communications device 270 for the allocation of communications resources for uplink transmissions, or for any other reason. The infrastructure equipment 272 may determine quality of service requirements applicable to the first service 708, and the allocation of communications resources may be in accordance with these quality of service requirements. In particular, the infrastructure equipment 272 may allocate the communications resources on a first BWP, the allocated communications resources selected based on the quality of service requirements and/or the numerology of the first BWP.

Accordingly, references to the infrastructure equipment 272 'providing a service' herein may also, or alternatively refer to the allocation of communications resources suitable for the transmission of data associated with the service.

At step S610, the communications device 270 determines that a second service, which in the example of FIG. 5 is an MBS service, is starting and will be available while the first service 708 remains available. The determination at step S610 may be based on the MBS schedule 702 received at step S602.

At step S612, the communications device 270 determines that it is to attempt to obtain the second service. This determination may be made based on user input via a user interface (e.g. by a user selecting, via the user interface, the second service), by pre-configuration, or by any other means. The details of how this determination is made are not important to the present disclosure.

At step S614, the communications device 270 transmits a service preference indication (SPI) 710 requesting that the first service 708 (or communications resources for the first service 708) continue to be provided by the infrastructure equipment 272 and that the first and second services be provided in a manner consistent with the ability of communications device 270. For example, the SPI 710 may comprise a request that, if the first and second services are provided on different BWPs, then the first and second services are provided in a manner consistent with the BWP capability of the communications device. The SPI 710 may comprise an identifier associated with the communications device 270.

The transmission at step S614 may be in response one or more of the determinations at steps S610 and S612.

In some embodiments, the transmission of the SPI 702 is additionally or alternatively in response to determining that one or more criteria are satisfied. In some embodiments, one or more such criteria may be specified by the SPI configuration indication 704. In some embodiments, one or more such criteria may depend on a capability of the communications device 270.

The criteria may include one or more of:

- the communications device 270 is configured (e.g. by means of the BWP configuration indication 706) with two or more BWPs;
- the communications device 270 is not capable of operating on two of the configured BWPs simultaneously;
- the communications device 270 is not capable of operating on the BWP on which the first service is provided and another configured BWP simultaneously; and
- the communications device 270 is not capable of operating on any pair of BWPs which have different numerology.

At step S616, the infrastructure equipment 272 receives an UE capability indication 712 comprising the BWP capability for the communications device 270. In the example of FIG. 5, the UE capability indication 712 is transmitted from the core network 102, and is based on the capability indication 701.

In some embodiments, the BWP capability is included within the SPI 710 and steps S616 and S601 may be omitted.

In some embodiments, the BWP capability is included in another message (not shown in FIG. 5) sent from the communications device 270 to the infrastructure equipment 272, and steps S601 and S616 may be omitted.

At step S618, the infrastructure equipment 272 determines the capability of the communications device 270 with respect to its ability to operate using different BWPs simultaneously.

At step S620, the infrastructure equipment 272 selects a second BWP for the provision of the second service. In some embodiments, the second BWP is selected based on the first BWP and the BWP capability of the communications device 270. In some embodiments, the first and second BWP are the same.

Alternatively, in some embodiments, at step S620, the infrastructure equipment 272 may select a different BWP for the provision of the first service from that currently used for the provision of the first service. That is, in some embodiments, the first BWP may change as a result of step S620, based on the capability determined at step S618. Such embodiments can avoid the need to reconfigure a pre-existing selection of BWP for the transmission of data associated with the second service. Where the second service is an MBS service being obtained by multiple communications devices, this can therefore avoid the need for the multiple communications devices which are obtaining the MBS service to be reconfigured based on the change of second BWP.

Subsequently, at step S622, the infrastructure equipment schedules communications resources, and transmits and receives data associated with, the first and second services 702, 714, using the first and second BWPs respectively, in accordance with the BWP capability of the communications device 270.

In accordance with some embodiments of the present technique, the infrastructure equipment 272 adapts scheduling of the data associated with the first service, based on the BWP capability of the communications device 270. The adaptation may comprise selection of communications resources taking into account frequency domain constraints and/or time domain constraints associated with the BWP capability of the communications device 270.

For example, the infrastructure equipment 272 may delay the transmission of data associated with the first service to a later time when the infrastructure equipment 272 determines that the communications device 270 will be operating using the first BWP.

Additionally or alternatively, in some embodiments, the infrastructure equipment 272 may select, for the transmission of the data associated with the first service, communications resources where the ability of the communications device 270 to receive and decode the first data is not impaired by interference corresponding to a simultaneous transmission of data associated with the second service. For example, the infrastructure equipment 272 may refrain from selecting physical resources where interference may occur from an MBS transmission for the transmission of the data associated with the first service.

Accordingly, the adaptation of the scheduling of the first data may be in either the time domain, the frequency domain, or both.

In the example of FIG. 5, obtaining the second service comprises receiving downlink transmissions and does not include any associated uplink transmissions. However in some embodiments, obtaining the second service may comprise transmitting control information and/or data by the communications device 270 to the infrastructure equipment 272.

Examples of such scheduling and data transmission which may be used at step S622 are described in further detail below. In particular, in some embodiments, one or more BWP switching control indications may be transmitted by the infrastructure equipment 272 to the communications device 270 in order for the communications device 270 to be able to determine on which BWP to operate at a given time in order to obtain both the first and second services, the data for the first and second services being transmitted on resources of, respectively, the first and second BWPs.

Subsequently, at step S624, the communications device 270 may determine that it is to stop receiving the second service, and (in some embodiments) to receive a different service instead of the second service. In such embodiments, the communications device 270 may transmit an indication 716 to the infrastructure equipment 272 indicating that it is no longer attempting to receive transmissions associated with the second service. The indication may be a second SPI.

Additionally or alternatively, if the communications device 270 determines that it is to attempt to obtain a third service, then the process may return to step S614 and a further SPI may be transmitted.

In some embodiments, when the communications device 270 determines at step S624 that it is to obtain a different (third) service, the communications device 270 may determine that the BWP(s) on which transmissions for the first and third services are scheduled are compatible with the communications device's capabilities, and that the communications device 270 is able to operate to obtain the first and third services concurrently, without requiring that the infrastructure equipment 272 schedule the transmissions in any particular manner in the time domain.

Accordingly, in some embodiments, the further SPI may indicate that the communications device 270 is able to operate to obtain the first and third services concurrently, without requiring that the infrastructure equipment 272 schedule the transmissions in any particular manner in the time domain and/or the frequency domain. In response to receiving the further SPI, the infrastructure equipment 272 may refrain from transmitting further BWP switching control indications and may schedule the transmissions associated with the first and third services without applying any constraint based on the capability of the communication device 270.

In some embodiments of the present technique, steps are carried out in the order of their description above and as shown in FIG. 5.

In some embodiments, the order of the steps may differ and/or one or more steps may be omitted. In some embodiments, one or more steps shown as involving the infrastructure equipment 272 may involve instead a different infrastructure equipment. For example, the MBS schedule may be received earlier than shown in FIG. 5, and may have been received from a different infrastructure equipment 272 and/or in a different cell.

In some embodiments, step S604 may be omitted. The communications device 270 may determine whether to transmit the SPI based on pre-configured criteria, which may be, for example, specified in relevant standards specifications.

In some embodiments, the UE capability 701 may be transmitted in response to the BWP configuration indication 706. In some such embodiments, the UE capability 701 may indicate the BWP capability in respect of one or more pairs of BWPs indicated by the BWP configuration indication 706.

In some embodiments, step S602 may occur before step S601. For example, if the communications device 270 is initially in an idle RRC mode, then the communications device 270 may receive the MBS schedule 702 as part of broadcast system information, and may send the capability indication 701 only when it has entered (or as part of the process of entering) an RRC connected mode.

In some embodiments, step S616 may occur independently of one or more other steps and/or may be done in accordance with conventional techniques for providing capability information from a core network element to a radio access network element, such as the infrastructure equipment 272. For example, step S616 may occur in response to the communications device 270 entering an RRC connected mode in the cell, or in another cell controlled by the infrastructure equipment 272. In some examples, the core network transmits the UE capability indication 712 to the infrastructure equipment 272 in response to determining that the communications device 270 is entering (or has entered) an RRC connected mode in the cell.

In the example of FIG. 5, the communications device 270 is obtaining the first service 708 prior to obtaining the second service. However, the present disclosure is not so limited, and the order may be reversed. That is, in some embodiments, the communications device 270 obtains the second service 714 prior to obtaining the first service 708.

In some embodiments, the infrastructure equipment 272 determines that the communications device 270 is unable to operate simultaneously using the first BWP and the second BWP. Accordingly, in response, at step S622, communications resources are allocated for the transmission of data such that simultaneous operation by the communications device 270 using both the first and second BWPs simultaneously is not required. The communications resources may, in some embodiments, be allocated in accordance with other constraints based on the BWP capability of the communications device.

In some embodiments, the communications resources for the transmission of data associated with the second service are allocated without regards to, i.e. independently of the SPI 710 and the BWP capability of the communications device, and the communications resources for the transmission of data associated with the first service are allocated based on (i.e. taking account of) the communications resources for the transmission of data associated with the second service, and one or both of the SPI 710 and the BWP capability of the communications device.

As part of step S622, the infrastructure equipment 272 may transmit one or more BWP switching control indications to the communications device 270, in order for the communications device 270 to determine whether it is to operate (i.e. receive and/or transmit data) using the first BWP or the second BWP.

Examples of BWP switching control indications include:

- an indication that BWP switching is to occur according to a periodic, repeating, schedule;
- an indication of a duration of an inactivity timer, the inactivity timer to be started after receipt of data on a BWP, and on whose expiry, the communications device 270 is to switch to the other BWP;

downlink control information (DCI) transmitted using resources of one BWP, to indicate that the communications device is to switch to the other BWP.

In some embodiments, the DCI additionally indicates communications resources of the other BWP on which downlink data is to be transmitted associated with the service using the other BWP.

In some embodiments, the allocation of resources for the transmission of the data associated with the first service, and/or the transmission of the BWP switching control indications may be based on a maximum permitted time for the communications device 270 to switch operation from one of the first and second BWP to the other of the first and second BWP.

BWP switching control indications may be specific to a direction of switching, and different types of BWP switching control indications may be used in each direction (i.e. from the first BWP to the second BWP, and from the second BWP to the first BWP).

Examples of these will now be described.

In some embodiments, the communications device 270 determines which BWP it is to operate one at a given time (or, when to switch from one BWP to the other) based on a schedule associated with one of the first and second services.

Figure 6:
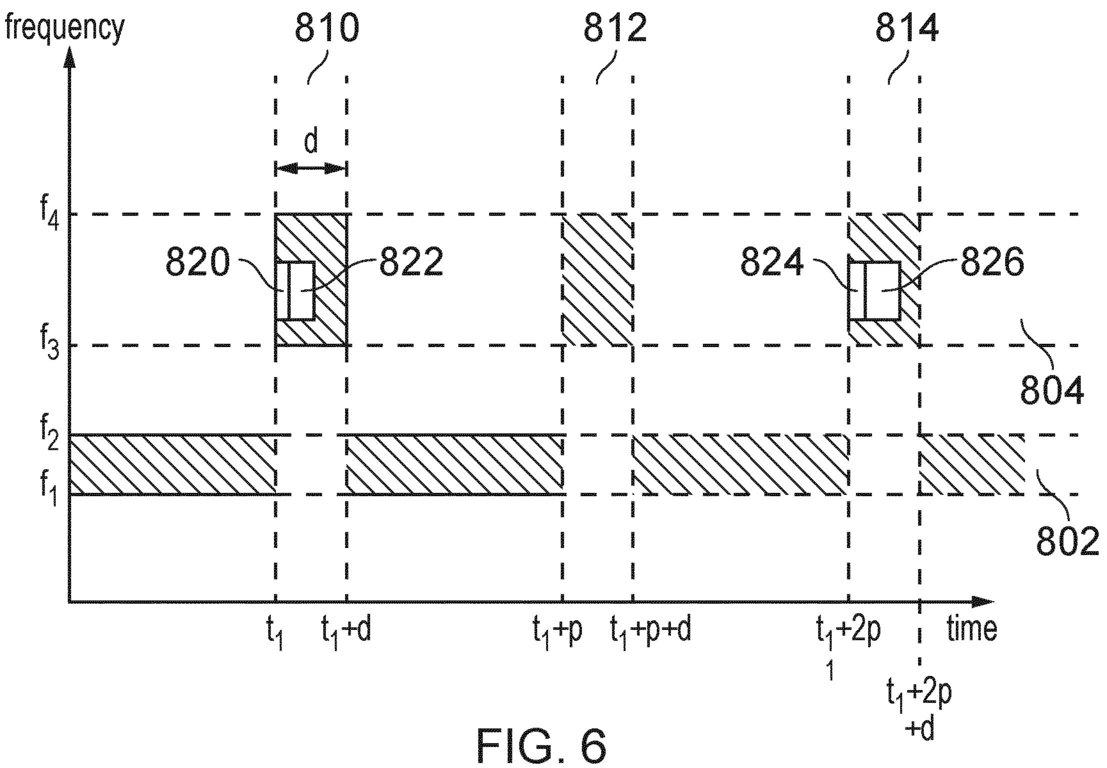
FIG. 6 illustrates the transmission of data associated with first and second services using communications resources of first and second bandwidth parts, in accordance with embodiments of the present technique.

FIG. 6 illustrates the transmission of data associated with the first and second services on the first and second BWPs, in which the communications device 270 determines a current BWP for operation based on a predetermined, periodic schedule.

For conciseness, FIG. 6 shows only downlink data transmissions and downlink BWPs. It will be appreciated that where uplink transmissions are also associated with either the first or second service, these will be scheduled using the uplink BWP corresponding to the currently active downlink BWP.

In the example of FIG. 6, the first service is provided using resources of a first BWP 802 extending from frequency f1 to frequency f2. The second service is provided using resources of a second BWP 804 extending from frequency f3 to frequency f4. In the example of FIG. 6, the BWPs are non-contiguous and are separated by a gap in the frequency domain (i.e. from frequency f2 to f3), however the present disclosure is not so limited and there may be no such gap between the first and second BWPs.

Figure 7:
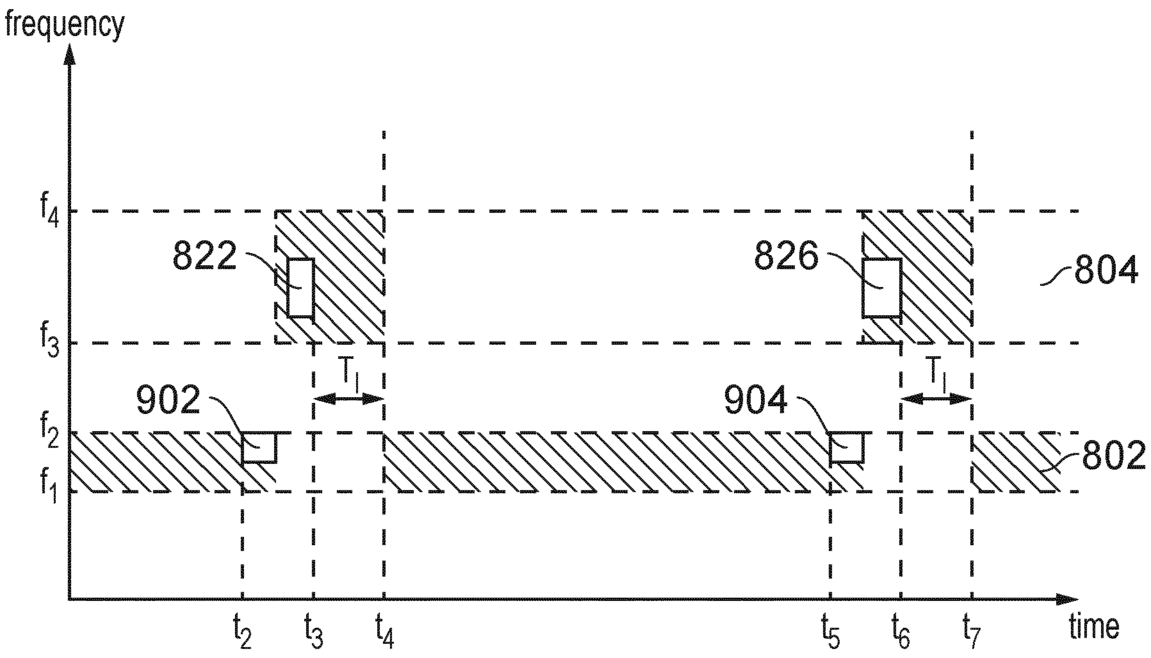
FIG. 7 illustrates the transmission of data associated with first and second services using communications resources of first and second bandwidth parts, in accordance with embodiments of the present technique.

The communications device 270 determines the periodic schedule based on either a BWP switching control indication transmitted by the infrastructure equipment 272, or based on a schedule for transmission associated with the second service. In FIG. 6 and FIG. 7, the BWP in which the communications device 270 is operating at any given time is indicated by hatching markings in the applicable BWP.

In any case, the communications device 270 determines that transmissions associated with the second service may occur on the second BWP 802, during time periods 810, 812, 814 which start at time (t1+nP) and end at time (t1+nP+d), for n=0, 1, 2, . . . where d indicates the duration of each time period.

The schedule indicating (or otherwise allowing the communications device 270 to determine) parameters t1 and d may be included within the MBS schedule 702, or may be transmitted by the infrastructure equipment 272 in response to receiving the SPI 702. The schedule (whether within the MBS schedule 702 or otherwise) may be indicated by means of radio resource control (RRC) signalling, by medium access control (MAC) control element (CE) signalling, or in any other appropriate manner.

Accordingly, at (or shortly before) time t1, the communications device 270 switches from operating using the first BWP 802 to operating using the second BWP 804. The transmission of downlink data associated with the second service may occur in any of these time periods, in accordance with any known techniques. In the example of FIG. 6, during the first time period 810, data associated with the second service is transmitted using resources 822, these resources being indicated by means of a downlink control information (DCI) transmission 820. In some embodiments, the DCI transmission 820 may comprise an indication of a radio network temporary identifier (RNTI) corresponding to the second service.

Preferably, the downlink control information transmission 820 and corresponding data transmission 822 are received and decoded by all communications devices 270 in the cell which are obtaining the second service, in order to reduce the amount of communications resources used for the provision of the second service in the cell.

Subsequently, at time t1+d, the communications device 270 switches from operating using the second BWP 804 to operating using the first BWP 802. Data transmissions associated with the first service are not shown, but these may take place at any time outside of the time periods 810, 812, 814. Where the data associated with the first service is unicast data, appropriate techniques (such as hybrid automatic repeat request, HARQ) may be used to ensure or improve the reliability of the data transmission.

The communications device 270 similarly switches operation to the second BWP during second and third time periods 812, 814. As shown in FIG. 6, during the third time period 814, further data associated with the second service is transmitted using resources 826. This transmission is preceded by DCI 824.

In some embodiments, the schedule and/or BWP switching control indication may indicate a maximum quantity of data associated with the second service to be transmitted within a single time period. In some such embodiments, the communications device 270 may, having received a quantity data associated with the second service, determine whether that quantity meets or exceeds the indicated maximum quantity of data. If so, then the communications device 270 may switch to operating using the first BWP, without waiting for the end of the time period. For example, the communications device 270 may initiate the switch to the first BWP immediately after receiving the maximum quantity of data.

In some embodiments, the use of a predetermined schedule may be combined with an inactivity timer, the duration of which may be indicated by the infrastructure equipment 272 in a BWP switching control indication. In such embodiments, the communications device 270 may start an inactivity timer which expires after the predetermined duration, or is reset if new data associated with the second service is received. The inactivity timer may be started when switching to the second BWP or only once data associated with the second service is received.

If the inactivity timer expires before the end of the time period (such as, referring to the example of FIG. 6, before the time (t1+nP+d), the communications device 270 switches operation to the first BWP.

In some embodiments, the duration of the inactivity timer may be zero, such that the communications device 270 switches back to the first BWP immediately after receiving any data associated with the second service 714 transmitted using the second BWP.

Accordingly, by using a predetermined, known schedule, the communications device 270 ensures it is operating using the second BWP when data associated with the second service may be scheduled. The infrastructure equipment 272 is also aware of the schedule, and accordingly schedules first service data (respectively, second service data) when the communications device 270 is operating using the first BWP (respectively, second BWP).

The use of a periodic schedule can allow a communications device to obtain both the first service and the second service in parallel, using communications resources on respective BWPs which are suitable for those services based on the quality of service requirements of the services and the numerology or availability of resources on those BWPs. The overhead associated with the signalling of the BWP switching control indication is low, because the schedule need only be transmitted once, and no further BWP switching control indications need to be sent.

FIG. 7 illustrates an example of the use of dynamic BWP switching control indications. In FIG. 7, data associated with the second service 714 is transmitted using resources 822, 826 as in the example of FIG. 6. However, in the example of FIG. 7, the communications device 270 switches from the first BWP 802 to the second BWP 804 in respect to receiving a BWP switching control indication transmitted using resources of the first BWP 802.

Specifically, at time t2, the infrastructure equipment 272 transmits, as a dynamic BWP switching control indication, downlink control information (DCI) 902. In response to receiving the DCI 902, the communications device 270 switches operation to the second BWP 804, and receives the second service data transmitted on the second BWP 804 using resources 822.

Preferably, the DCI 902 is transmitted such that a maximum switching time permitted for the communications device 270 to switch from the first BWP 802 to the second BWP 804 is satisfied.

Accordingly, the communications device 270 is able to re-tune its receiver circuitry to the frequency range associated with the second BWP 804.

In some embodiments, the communications device 270 receives, on resources of the second BWP 804, a DCI 820 indicating the resources 822 used for the transmission of the data associated with the second service.

Alternatively, in some embodiments, the DCI 902 indicates the communications resources 822 of the second BWP 804. Accordingly, the DCI 902 may comprise an indication of one or more of resource block allocations corresponding to the resources 822 on the second BWP, modulation and coding scheme (MCS) used for the transmission of the data in the resources 822, and HARQ parameters associated with that data. The communications device 270 is thus able to receive the data of the second service without receiving (or at least, without decoding) any DCI sent on the second BWP 804.

A further DCI (such as the DCI 820 illustrated in FIG. 6) may in any case be transmitted by the infrastructure equipment 272 on the second BWP 804, in order to indicate to other communications devices which are receiving the second BWP 804 at the time, of the resources 822 used for the transmission of the data associated with the second service.

The dynamic BWP switching control indication (e.g. the DCI 902) may comprise an indication of an RNTI corresponding to the second service. In some embodiments, this may be the same RNTI as used in DCI transmitted using the second BWP 804 indicating the allocation of resources for the transmission of data associated with the second service.

Instances of the dynamic BWP switching control indication may be used to indicate that the communications device

270 is to switch from the first BWP 802 (used for the first service) to the second BWP 804, from the second BWP 804 to the first BWP 802, or both.

In some embodiments, instances of the dynamic BWP switching control indication are used to indicate that the communications device 270 is to switch from one BWP to another BWP, and one or more of the inactivity timer and maximum quantity of data assessment (as described above) are used by the communications device 270 to determine when to switch in the opposite direction.

In the example of FIG. 7, an inactivity timer, having duration TI, is used. Accordingly, at time t3 at the end of the resources 822 in which the data associated with the second service is received, the communications device 270 starts an inactivity timer. At t4 (where t4=t3+TI), the timer expires, and the communications device switches from the second BWP 804 to the first BWP 802. Similarly, at time t6, at the end of the resources 826, the inactivity timer is started. The inactivity timer expires at time t7 (t7=t6+TI), and the communications device 270 switches from the second BWP 804 to the first BWP 802.

Accordingly, in embodiments such as that illustrated in FIG. 7, the communications device 270 performs only a single change from the first BWP 802 to the second BWP 804 in response to receiving a dynamic BWP switching control indication. This is in contrast to the case where the BWP switching control indication comprises an indication of a schedule, based on which the communications device 270 performs multiple changes from the first BWP 802 to the second BWP 804.

The use of dynamic BWP switching control indications can allow a communications device to obtain both the first service and the second service in parallel, using communications resources on respective BWPs which are suitable for those services based on the quality of service requirements of the services and the numerology or availability of resources on those BWPs. The dynamic nature of the BWP switching control indications means that the communications device switches to a BWP only when data is scheduled to be transmitted on that BWP for the respective service. Accordingly, the ability of the communications device 270 to obtain the other service (on the other BWP) with minimal interruption. For example, as shown in FIG. 7, the communications device 270 continues to use the first BWP 802 from time t4 until time t5, thus avoiding switching to the second BWP 804 when in fact no downlink data is scheduled using the second BWP 804 during that time.

The use of dynamic BWP switching control indications can therefore avoid the need to indicate a schedule, and can provide more efficient use of communications resources and more flexibility in scheduling transmissions associated with the first and second services, particularly where transmissions associated with the second service do not generally conform with a periodic transmission pattern.

In accordance with embodiments of the present technique, the infrastructure equipment 272 is able to determine, at any point in time, whether the communications device 270 is operating using the first BWP 802, the second BWP 804 or (if the capabilities of the communications device 270 permit) both. Thus, the infrastructure equipment 272 schedules data transmissions associated with each of the first and second services using resources of their respective BWPs, at times which are consistent with the behaviour of the communications device 270.

For example, in the example of FIG. 7, the infrastructure equipment 272 refrains from scheduling data associated with the first service, using the first BWP, between time t2 and time t4. Between time t4 and time t5, the infrastructure equipment 272 determines that the communications device 270 is operating using the first BWP 802, and thus schedules the transmission of data associated with the first service using the first BWP 802 during this time.

In the examples of FIG. 6 and FIG. 7, only a single communications device is described. However, it will be appreciated that in some embodiments, multiple communications device 270 may be configured to receive the second service if it is an MBS service. Furthermore, the two or more communications devices 270 may be both configured to receive the second service while obtaining other (unicast) services. The other unicast services may be provided by means of communications resources on different BWPs, which differ both from the BWP used for the second service and from each other.

Accordingly, in some embodiments, the infrastructure equipment transmits BWP switching control indications to a plurality of communications devices, for indicating when each communications device should switch to the BWP on which data associated with the second service is scheduled. The same BWP switching control indication (e.g. schedule, or DCI) may be transmitted to each of the plurality of communications devices. In some embodiments, different BWP switching control indications may be sent to different communications devices.

In some embodiments, two or more communications devices 270 are obtaining respective (e.g. different) first services on the (same) first BWP, and the second service on the same second BWP. The infrastructure equipment 272 may transmit a single BWP switching control indication to indicate to the two or more communications devices 270 that data is to be (or may be) associated with the second service is to be transmitted using the second BWP. For example, where the single BWP switching control indication is a dynamic BWP switching control indication, it may comprise an identifier associated with the second service, known to all of the two or more communications devices. The identifier may be an RNTI.

Where the BWP switching control indication for a communications device is dynamic, then it is transmitted using resources of the BWP on which that communications device is receiving or transmitting data associated with the service which is not the second (MBS) service.

In accordance with some embodiments of the present technique, one or more communications devices obtains the second service while not obtaining any other service (e.g. a unicast first service). Such communications devices may initially therefore be in an idle or inactive state, in which no active RRC connection is established with the infrastructure equipment.

Conventionally, a communications device in such a state may be configured for discontinuous reception, whereby the infrastructure equipment 272 is constrained to transmit signalling for the communications device 270 within predetermined time periods (DRX "on" periods). The communications device 270 can thus reduce power consumption during periods outside these DRX on periods, for example by disabling or reducing a capability of its receiver circuitry.

In some embodiments of the present technique, the communications device 270 may transmit the SPI 710 to the infrastructure equipment, while having no active RRC connection. In response, the infrastructure equipment 272 may transmit a DRX configuration indication. According to the indicated DRX configuration, the predetermined time periods (DRX 'on' periods) during which the infrastructure equipment 272 may transmit signalling for the communications device 270 correspond to (e.g. encompass, align with, or form a part of) time periods when the infrastructure equipment 272 may transmit data associated with the second service.

For example, referring to the example shown in FIG. 6 and described above, in accordance with some embodiments, the infrastructure equipment 272 may indicate a DRX configuration whereby the infrastructure equipment 272 may transmit signalling for the communications device 270 only during time periods 810, 812, 814 defined by time periods starting at time (t1+nP) and end at time (t1+nP+d), for n=0, 1, 2, . . . .

In response, the communications device 270 may monitor the second BWP 804 for both transmissions associated with the second service and for unicast signalling directed to it, and is permitted to (and thus may) reduce its power consumption by de-activating some or all of its receiver circuitry outside of the indicated time periods.

Accordingly, the communications device 270 is able to continue to operate in accordance with a DRX configuration and to obtain the second service.

In some embodiments of the present technique, the wireless access interface may be based on frequency division duplexing (FDD) whereby uplink transmissions occur within one or more frequency ranges which are distinct from, and non-overlapping with, frequency ranges used for downlink transmissions.

In some embodiments of the present technique, the wireless access interface may be based on time division duplexing (TDD) whereby uplink transmissions and downlink transmissions may occur within a given frequency range. In some such embodiments, BWPs may nevertheless be designated as 'uplink' or 'downlink', such that within a given uplink (respectively, downlink) BWP, only uplink (respectively, downlink) transmissions occur.

As set out in [4], a principle for operation of BWPs in a TDD operation may be that a communications device is not required to re-tune its transmitter and receiver circuitry when switching from transmit to receive. According to embodiments of the present technique, where both uplink and downlink communications resources are allocated for the provision of the second service (where the second service may be an MBS service) in accordance with TDD operation, the uplink and downlink communications resources are within respective BWPs which comply with the requirement that no communications device obtaining the second service is required to re-tune its receiver or transmitter circuitry when switching from receive to transmit (or vice versa) in respect of data transmissions associated with the second service.

The infrastructure equipment 272 may accordingly select the uplink and downlink communications resources based on the UE BWP capability indication, wherein the BWP capability indication comprises an indication of a constraint applicable to a pair of uplink and downlink BWPs such that the communications device 270 is capable of receiving and transmitting using those BWPs, without re-tuning its transmitter and receiver circuitry.

In some embodiments, the infrastructure equipment satisfies this constraint in respect of the transmissions associated with the second service, independently of the selection of resources for transmissions associated with any first service being obtained by the communications device.

In some embodiments, the infrastructure equipment satisfies this constraint in respect of the transmissions associated with the second service jointly with the selection of resources for transmissions associated with the first service, such that the communications device is additionally capable of switching between obtaining the first service using a first pair of BWPs, and obtaining the second service using a second pair of BWPs, without re-tuning its transmitter and receiver circuitry.

In accordance with some embodiments of the present technique, the communications device 270 may change its serving cell while receiving the first and second services (e.g. during step S622 of FIG. 5). The change of serving cell may be as a result of a handover (i.e. network-controlled mobility procedure).

In some embodiments of the present technique, the SPI 710 received from the communications device 270 at step S614 may be forwarded from the infrastructure equipment 272 to another infrastructure equipment, the other infrastructure equipment controlling the new serving cell.

In some embodiments of the present technique, after a change of serving cell in accordance with a procedure in which the SPI 710 is not forwarded to the other infrastructure equipment, the communications device 270 may transmit the SPI 710 in the new cell to the other infrastructure equipment.

Accordingly, the process of FIG. 5 may continue with step S618 and subsequent steps, in which the other infrastructure equipment carries out the steps shown in FIG. 5 as being carried out by the infrastructure equipment 272.

Aspects disclosed herein may be combined or divided and separated in combinations other than are explicitly disclosed above. In particular, the process illustrated in FIG. 5 and described above may be shortened by the omission of one or more steps, re-ordered, and/or combined with one or more of the aspects related to cell change. The process of FIG. 5 may be applied in the context of an FDD (frequency division duplex) system or a TDD system, for example as described herein. Accordingly, embodiments of the present technique can provide a method of requesting, by a communications device, the provision of a first service and a second service in a wireless communications network, the method comprising transmitting to an infrastructure equipment of the wireless communications network a service preference indication (SPI), the SPI requesting the infrastructure equipment to provide to the communications device the first service and the second service in accordance with a bandwidth parts capability of the communications device, wherein in accordance with the bandwidth parts capability, the communications device is unable to receive and decode first data transmitted using a first bandwidth part of a carrier bandwidth of a wireless access interface provided by the infrastructure and second data transmitted using a second bandwidth part of the carrier bandwidth, if the first data and the second data are transmitted simultaneously.

There has also been described a method of receiving, by a communications device, first service data associated with a first service and second service data associated with a second service in a wireless communications network, the method comprising: receiving the first service data associated with the first service, the first service data transmitted by an infrastructure equipment using communications resources within a first bandwidth part of a carrier bandwidth of a wireless access interface provided by the infrastructure equipment, controlling a receiver of the communications device to receive signals within a second bandwidth part of the carrier bandwidth, and receiving the second service data associated with the second service, the second service data transmitted by the infrastructure equipment using communications resources within the second bandwidth part, wherein the communications device is unable to receive and decode first data transmitted using the first bandwidth part and second data transmitted using the second bandwidth part, if the first data and the second data are transmitted simultaneously.

There has further been described a method of providing a first service and a second service to a communications device in a cell of a wireless communications network, the method comprising: receiving a service preference indication (SPI) transmitted by the communications device, the SPI requesting the infrastructure equipment to provide to the communications device the first service and the second service in accordance with a bandwidth parts capability of the communications device, wherein in accordance with the bandwidth parts capability, the communications device is unable to receive, simultaneously, first data transmitted using a first bandwidth part of a carrier bandwidth of a wireless access interface provided by the infrastructure equipment and second data transmitted using a second bandwidth part of the carrier bandwidth.

There has further been described a method of transmitting, by an infrastructure equipment of a wireless communications network, first service data associated with a first service and second service data associated with a second service, the method comprising: allocating first communications resources within a first bandwidth part (BWP) of a carrier bandwidth of a wireless access interface provided by the infrastructure equipment in a cell for the transmission of the first service data to a communications device, allocating second communications resources within a second BWP of the carrier bandwidth for the transmission of the second service data, wherein the first communications resources and the second communications resources are allocated in accordance with a bandwidth parts capability of the communications device, wherein in accordance with the bandwidth parts capability, the communications device is unable to receive and decode first data transmitted using the first BWP and second data transmitted using the second BWP if the first data and the second data are transmitted simultaneously.

Corresponding communications devices, infrastructure equipment and circuitry for a communications device and circuitry for infrastructure equipment have also been described.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will further be appreciated that the principles described herein are applicable not only to LTE-based or 5G/NR-based wireless telecommunications systems, but are applicable for any type of wireless telecommunications system in which communications resources may be arranged and configured as a plurality of frequency ranges. In particular, the principles may be applicable where communications resources within a carrier bandwidth of a cell may be arranged and configured as a plurality of frequency ranges Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of requesting, by a communications device, provision of a first service and a second service in a wireless communications network, the method comprising: transmitting to an infrastructure equipment of the wireless communications network a service preference indication (SPI), the SPI requesting the infrastructure equipment to provide to the communications device the first service and the second service in accordance with a bandwidth parts capability of the communications device, wherein in accordance with the bandwidth parts capability, the communications device is unable to receive and decode first data transmitted using a first bandwidth part of a carrier bandwidth of a wireless access interface provided by the infrastructure equipment in a cell and second data transmitted using a second bandwidth part of the carrier bandwidth, if the first data and the second data are transmitted simultaneously.

Paragraph 2. A method according to paragraph 1, wherein the first service is a unicast service and the second service is a multicast/broadcast service (MBS).

Paragraph 3. A method according to paragraph 1 or paragraph 2, wherein in accordance with the bandwidth parts capability, the communications device is able to receive and decode the first data and the second data if values of one or more parameters for transmission of signals using the first bandwidth part are the same as values of the one or more parameters for transmission of signals using the second bandwidth part.

Paragraph 4. A method according to paragraph 3, wherein the one or more parameters include one or more of a sub-carrier spacing, an orthogonal frequency division multiplexing (OFDM) symbol period duration, and an OFDM cyclic prefix duration.

Paragraph 5. A method according to any of paragraphs 1 to 4, wherein in accordance with the bandwidth parts capability, the communications device is able to receive and decode the first data and the second data if a frequency separation between the first bandwidth part and the second bandwidth part exceeds a minimum bandwidth gap.

Paragraph 6. A method according to any of paragraphs 1 to 5, the method comprising transmitting to the infrastructure equipment an indication of the bandwidth parts capability of the communications device.

Paragraph 7. A method according to any of paragraphs 1 to 6, the method comprising determining that the second service is scheduled to be provided, wherein transmitting the SPI is in response to the determining that the second service is scheduled to be provided.

Paragraph 8. A method according to any of paragraphs 1 to 7, the method comprising receiving from the infrastructure equipment an SPI configuration indication indicating one or more conditions for transmitting the SPI, and determining that the conditions for transmitting the SPI are satisfied, wherein the transmitting the SPI is in response to the determining that the conditions for transmitting the SPI are satisfied.

Paragraph 9. A method according to any of paragraphs 1 to 8, the method comprising receiving from the infrastructure a bandwidth parts indication indicating one or more of a frequency range of the first bandwidth part, and a frequency range of the second bandwidth part.

Paragraph 10. A method according to any of paragraphs 1 to 9, the method comprising receiving first service data associated with the first service, the first service data transmitted by the infrastructure equipment using communications resources within the first bandwidth part, controlling a receiver of the communications device to receive signals within the second bandwidth part, and receiving second service data associated with the second service, the second service data transmitted by the infrastructure equipment using communications resources within the second bandwidth part.

Paragraph 11. A method according to paragraph 10, the method comprising receiving a BWP switching control indication, and determining when to control the receiver of the communications device to receive signals within the second bandwidth part based on the BWP switching control indication.

Paragraph 12. A method according to paragraph 11 wherein the BWP switching control indication is transmitted using one of radio resource control (RRC) signalling, a medium access control (MAC) control element (CE), and physical layer (PHY) signalling.

Paragraph 13. A method according to paragraph 11 or paragraph 12, wherein the BWP switching control indication is broadcast or multicast.

Paragraph 14. A method according to any of paragraphs 11 to 13, wherein the BWP switching control indication comprises an indication of a plurality of switching times, each of the switching times associated with a start time of a period during which the infrastructure equipment may transmit the second service data in accordance with a schedule for the second service, wherein controlling the receiver of the communications device to receive the signals within the second bandwidth part comprises controlling the receiver of the communications device to receive the signals within the second bandwidth part starting from the start time.

Paragraph 15. A method according to any of paragraphs 10 to 14, the method further comprising receiving an indication of the schedule for the second service from the infrastructure equipment.

Paragraph 16. A method according to paragraph 11, wherein the BWP switching control indication comprises downlink control information transmitted by the infrastructure equipment using communications resources within the first bandwidth part, the downlink control information comprising an identifier associated with the second service, wherein controlling the receiver of the communications device to receive signals within the second bandwidth part is in response to receiving the downlink control information.

Paragraph 17. A method according to paragraph 16, wherein the downlink control information comprises an indication of the communications resources within the second bandwidth part used by the infrastructure equipment for the transmission of the second service data.

Paragraph 18. A method according to paragraph 16 or paragraph 17, wherein the identifier is a group radio network temporary identifier (RNTI).

Paragraph 19. A method according to any of paragraphs 10 to 18, the method comprising: after receiving the second service data, controlling the receiver of the communications device to receive signals within the first bandwidth part, and receiving further first service data transmitted by the infrastructure equipment using communications resources within the first bandwidth part.

Paragraph 20. A method according to paragraph 19, the method comprising determining an end time of a period during which the infrastructure equipment may transmit the second service data in accordance with a schedule for the second service, wherein controlling the receiver of the communications device to receive the signals within the first bandwidth part comprises controlling the receiver of the communications device to receive the signals within the first bandwidth part after the end time.

Paragraph 21. A method according to paragraph 19, the method comprising: determining that a time duration since the end of the communications resources within the second bandwidth part used by the infrastructure equipment for the transmission of the second service data exceeds a predetermined duration, wherein the controlling the receiver of the communications device to receive signals within the first bandwidth part is in response to the determining that the time duration exceeds the predetermined duration.

Paragraph 22. A method according to paragraph 19, the method comprising: determining that a quantity of second service data received after the controlling the receiver of the communications device to receive signals within the second bandwidth part exceeds a predetermined quantity, wherein the controlling the receiver of the communications device to receive signals within the first bandwidth part is in response to the determining that the quantity of second service data exceeds the predetermined quantity.

Paragraph 23. A method according to any of paragraphs 1 to 22, the method comprising changing a serving cell of the communications device from the cell to another cell, and in response to changing the serving cell, transmitting the SPI to another infrastructure equipment associated with the other cell.

Paragraph 24. A method of receiving, by a communications device, first service data associated with a first service and second service data associated with a second service in a wireless communications network, the method comprising: receiving the first service data associated with the first service, the first service data transmitted by an infrastructure equipment using communications resources within a first bandwidth part of a carrier bandwidth of a wireless access interface provided by the infrastructure equipment, controlling a receiver of the communications device to receive signals within a second bandwidth part of the carrier bandwidth, and receiving the second service data associated with the second service, the second service data transmitted by the infrastructure equipment using communications resources within the second bandwidth part, wherein the communications device is unable to receive and decode first data transmitted using the first bandwidth part and second data transmitted using the second bandwidth part, if the first data and the second data are transmitted simultaneously.

Paragraph 25. A method of providing a first service and a second service to a communications device in a cell of a wireless communications network, the method comprising: receiving a service preference indication (SPI) transmitted by the communications device, the SPI requesting the infrastructure equipment to provide to the communications device the first service and the second service in accordance with a bandwidth parts capability of the communications device, wherein in accordance with the bandwidth parts capability, the communications device is unable to receive, simultaneously, first data transmitted using a first bandwidth part of a carrier bandwidth of a wireless access interface provided by the infrastructure equipment and second data transmitted using a second bandwidth part of the carrier bandwidth.

Paragraph 26. A method according to paragraph 25, the method further comprising receiving an indication of the bandwidth parts capability of the communications device.

Paragraph 27. A method according to paragraph 25, wherein the indication of the bandwidth parts capability of the communications device is transmitted by the communications device.

Paragraph 28. A method according to paragraph 25, wherein the indication of the bandwidth parts capability of the communications device is transmitted by a core network part of the wireless communications network.

Paragraph 29. A method according to any of paragraphs 25 to 28, the method further comprising: allocating first communications resources within the first bandwidth part (BWP) for the transmission of the first service data to a communications device, and allocating second communications resources within the second BWP for the transmission of the second service data, wherein the first communications resources and the second communications resources are allocated in accordance with the bandwidth parts capability of the communications device Paragraph 30. A method according to any of paragraphs 25 to 29, the method further comprising: determining that the communications device is about to change, or has changed serving cell to another cell, and in response to the determining that the communications device is about to change, or has changed serving cell, transmitting the service preference indication to another infrastructure equipment which controls the other cell.

Paragraph 31. A method of transmitting, by an infrastructure equipment of a wireless communications network, first service data associated with a first service and second service data associated with a second service, the method comprising: allocating first communications resources within a first bandwidth part (BWP) of a carrier bandwidth of a wireless access interface provided by the infrastructure equipment in a cell for the transmission of the first service data to a communications device, and allocating second communications resources within a second BWP of the carrier bandwidth for the transmission of the second service data, wherein the first communications resources and the second communications resources are allocated in accordance with a bandwidth parts capability of the communications device, wherein in accordance with the bandwidth parts capability, the communications device is unable to receive and decode first data transmitted using the first BWP and second data transmitted using the second BWP if the first data and the second data are transmitted simultaneously.

Paragraph 32. A method according to paragraph 31, the method comprising transmitting a BWP switching control indication indicating when the communications device should switch operation from one of the first and second BWPs to the other of the first and second BWPs in order to receive the first service data and the second service data.

Paragraph 33. A method according to any of paragraphs 24 to 32, wherein the first service is a unicast service and the second service is a multicast/broadcast service (MBS)

Paragraph 34. A communications device for operating in a wireless communications network, the communications device comprising a transmitter configured to transmit signals via a wireless access interface provided by an infrastructure equipment in a cell of the wireless communications network, a receiver configured to receive signals via the wireless access interface, and a controller configured to control the transmitter and the receiver so that the communications device is operable: to transmit to the infrastructure equipment a service preference indication (SPI), the SPI requesting the infrastructure equipment to provide to the communications device the first service and the second service in accordance with a bandwidth parts capability of the communications device, wherein in accordance with the bandwidth parts capability, the communications device is unable to receive and decode first data transmitted using a first bandwidth part of a carrier bandwidth of the and second data transmitted using a second bandwidth part of the carrier bandwidth, if the first data and the second data are transmitted simultaneously.

Paragraph 35. Circuitry for a communications device for operating in a wireless communications network, the circuitry comprising transmitter circuitry configured to transmit signals via a wireless access interface provided by an infrastructure equipment in a cell of the wireless communications network, receiver circuitry configured to receive signals via the wireless access interface, and controller circuitry configured to control the transmitter circuitry and the receiver circuitry so that the communications device is operable: to transmit to the infrastructure equipment a service preference indication (SPI), the SPI requesting the infrastructure equipment to provide to the communications device the first service and the second service in accordance with a bandwidth parts capability of the communications device, wherein in accordance with the bandwidth parts capability, the communications device is unable to receive and decode first data transmitted using a first bandwidth part of a carrier bandwidth of the and second data transmitted using a second bandwidth part of the carrier bandwidth, if the first data and the second data are transmitted simultaneously.

Paragraph 36. A communications device for operating in a wireless communications network, the communications device comprising a transmitter configured to transmit signals via a wireless access interface provided by an infrastructure equipment in a cell of the wireless communications network, a receiver configured to receive signals via the wireless access interface, and a controller configured to control the transmitter and the receiver so that the communications device is operable: to receive first service data associated with a first service, the first service data transmitted by the infrastructure equipment using communications resources within a first bandwidth part of a carrier bandwidth of the wireless access interface, to control a receiver of the communications device to receive signals within a second bandwidth part of the carrier bandwidth, and to receive second service data associated with a second service, the second service data transmitted by the infrastructure equipment using communications resources within the second bandwidth part, wherein the communications device is unable to receive and decode first data transmitted using the first bandwidth part and second data transmitted using the second bandwidth part, if the first data and the second data are transmitted simultaneously.

Paragraph 37. Circuitry for a communications device for operating in a wireless communications network, the circuitry comprising transmitter circuitry configured to transmit signals via a wireless access interface provided by an infrastructure equipment in a cell of the wireless communications network, receiver circuitry configured to receive signals via the wireless access interface, and controller circuitry configured to control the transmitter circuitry and the receiver circuitry so that the communications device is operable: to receive first service data associated with a first service, the first service data transmitted by the infrastructure equipment using communications resources within a first bandwidth part of a carrier bandwidth of the wireless access interface, to control a receiver of the communications device to receive signals within a second bandwidth part of the carrier bandwidth, and to receive second service data associated with a second service, the second service data transmitted by the infrastructure equipment using communications resources within the second bandwidth part, wherein the communications device is unable to receive and decode first data transmitted using the first bandwidth part and second data transmitted using the second bandwidth part, if the first data and the second data are transmitted simultaneously.

Paragraph 38. Infrastructure equipment for use in a wireless communications network, the infrastructure equipment providing a wireless access interface for communicating with a communications device in a cell, the infrastructure equipment comprising a transmitter configured to transmit signals to the communications device via the wireless access interface, a receiver configured to receive signals from the communications device, and a controller configured to control the transmitter and the receiver so that the infrastructure equipment is operable to receive a service preference indication (SPI) transmitted by the communications device, the SPI requesting the infrastructure equipment to provide to the communications device the first service and the second service in accordance with a bandwidth parts capability of the communications device, wherein in accordance with the bandwidth parts capability, the communications device is unable to receive, simultaneously, first data transmitted using a first bandwidth part of a carrier bandwidth of a wireless access interface provided by the infrastructure equipment and second data transmitted using a second bandwidth part of the carrier bandwidth.

Paragraph 39. Circuitry for an infrastructure equipment for use in a wireless communications network, the infrastructure equipment providing a wireless access interface for communicating with a communications device in a cell, the circuitry comprising transmitter circuitry configured to transmit signals to the communications device via the wireless access interface, receiver circuitry configured to receive signals from the communications device, and controller circuitry configured to control the transmitter circuitry and the receiver circuitry so that the infrastructure equipment is operable to receive a service preference indication (SPI) transmitted by the communications device, the SPI requesting the infrastructure equipment to provide to the communications device the first service and the second service in accordance with a bandwidth parts capability of the communications device, wherein in accordance with the bandwidth parts capability, the communications device is unable to receive, simultaneously, first data transmitted using a first bandwidth part of a carrier bandwidth of a wireless access interface provided by the infrastructure equipment and second data transmitted using a second bandwidth part of the carrier bandwidth.

Paragraph 40. Infrastructure equipment for use in a wireless communications network, the infrastructure equipment providing a wireless access interface for communicating with a communications device in a cell, the infrastructure equipment comprising a transmitter configured to transmit signals to the communications device via the wireless access interface, a receiver configured to receive signals from the communications device, and a controller configured to control the transmitter and the receiver so that the infrastructure equipment is operable to allocate first communications resources within a first bandwidth part (BWP) of a carrier bandwidth of the wireless access interface for the transmission of the first service data to a communications device, and to allocate second communications resources within a second BWP of the carrier bandwidth for the transmission of the second service data, wherein the first communications resources and the second communications resources are allocated in accordance with a bandwidth parts capability of the communications device, and wherein, in accordance with the bandwidth parts capability, the communications device is unable to receive and decode first data transmitted using the first BWP and second data transmitted using the second BWP if the first data and the second data are transmitted simultaneously.

Paragraph 41. Circuitry for an infrastructure equipment for use in a wireless communications network, the infrastructure equipment providing a wireless access interface for communicating with a communications device in a cell, the circuitry comprising transmitter circuitry configured to transmit signals to the communications device via the wireless access interface, receiver circuitry configured to receive signals from the communications device, and controller circuitry configured to control the transmitter circuitry and the receiver circuitry so that the infrastructure equipment is operable to allocate first communications resources within a first bandwidth part (BWP) of a carrier bandwidth of the wireless access interface for the transmission of the first service data to a communications device, and to allocate second communications resources within a second BWP of the carrier bandwidth for the transmission of the second service data, wherein the first communications resources and the second communications resources are allocated in accordance with a bandwidth parts capability of the communications device, and wherein, in accordance with the bandwidth parts capability, the communications device is unable to receive and decode first data transmitted using the first BWP and second data transmitted using the second BWP if the first data and the second data are transmitted simultaneously.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] RP-182090, "Revised SID: Study on NR Industrial Internet of Things (IoT)," 3GPP RAN #81.

[2] Holma H. and Toskala A, "LTE for UMTS OFDMA and SC-FDMA based radio access", John Wiley and Sons, 2009

[3] 3GPP TS 38.321, "Medium Access Control (MAC) protocol specification (Rel-15)", v15.3.0

[4] 3GPP document R1-1718901, "Summary of Bandwidth Part Operation", MediaTek Inc, 3GPP TSG RAN WG1 Meeting 90bis, Prague, CZ, 9-13 Oct. 2017

What is claimed is:

1. A method of requesting, by a communications device, provision of a first service and a second service in a wireless communications network, the method comprising:

transmitting to an infrastructure equipment an indication of a bandwidth parts capability of the communications device; and transmitting to the infrastructure equipment of the wireless communications network a service preference indication (SPI), the SPI requesting that the first service continue to be provided to the communications device and that the first service and the second service be provided to the communications device in accordance with the bandwidth parts capability of the communications device, wherein the SPI includes an indication of a switching time required by the communications device to switch operation from a first bandwidth part of a carrier bandwidth of a wireless access interface provided by the infrastructure equipment in a cell to a second bandwidth part of the carrier bandwidth and a minimum size of a gap in a frequency domain separating the first bandwidth part and the second bandwidth part required for the communications device to operate on both bandwidth parts, in accordance with the bandwidth parts capability, the communications device is unable to receive and decode first data transmitted by the infrastructure equipment using the first bandwidth part and second data transmitted by the infrastructure equipment using the second bandwidth part, if the first data and the second data are transmitted by the infrastructure equipment simultaneously, and in response to the communications device being unable to receive and decode the first data transmitted and the second data transmitted simultaneously corresponding to an inability for simultaneous reception, the SPI communicates to the infrastructure equipment the inability for simultaneous reception on the first bandwidth part and the second bandwidth part, and the infrastructure equipment adapts scheduling of communications resources for at least one of the first service and the second service.

2. The method according to claim 1, wherein:
the first service is a unicast service and the second service is a multicast/broadcast service (MBS).

3. The method according to claim 1, wherein:
in accordance with the bandwidth parts capability, the communications device is able to receive and decode the first data and the second data if values of one or more parameters for transmission of signals using the first bandwidth part are the same as values of the one or more parameters for transmission of signals using the second bandwidth part.

4. The method according to claim 3, wherein:
the one or more parameters include one or more of a sub-carrier spacing, an orthogonal frequency division multiplexing (OFDM) symbol period duration, and an OFDM cyclic prefix duration.

5. The method according to claim 1, wherein:
in accordance with the bandwidth parts capability, the communications device is able to receive and decode the first data and the second data if a frequency separation between the first bandwidth part and the second bandwidth part exceeds a minimum bandwidth gap.

6. The method according to claim 1, the method comprising:
determining that the second service is scheduled to be provided, wherein
transmitting the SPI is in response to the determining that the second service is scheduled to be provided.

7. The method according to claim 1, the method comprising:
receiving from the infrastructure equipment an SPI configuration indication indicating one or more conditions for transmitting the SPI, and
determining that the conditions for transmitting the SPI are satisfied, wherein
the transmitting the SPI is in response to the determining that the conditions for transmitting the SPI are satisfied.

8. The method according to claim 1, the method comprising:
receiving from the infrastructure a bandwidth parts indication indicating one or more of a frequency range of the first bandwidth part, and a frequency range of the second bandwidth part.

9. The method according to claim 1, the method comprising:
receiving first service data associated with the first service, the first service data transmitted by the infrastructure equipment using the communications resources within the first bandwidth part,
controlling a receiver of the communications device to receive signals within the second bandwidth part, and
receiving second service data associated with the second service, the second service data transmitted by the infrastructure equipment using the communications resources within the second bandwidth part.

10. The method according to claim 9, the method comprising:
receiving a BWP switching control indication, and
determining when to control the receiver of the communications device to receive signals within the second bandwidth part based on the BWP switching control indication, wherein
controlling the receiver of the communications device includes re-tuning receiver circuitry of the communications device to a frequency range associated with the second bandwidth part to receive signals within the first bandwidth part and the second bandwidth part alternately.

11. The method according to claim 10, wherein:
the BWP switching control indication is transmitted using one of radio resource control (RRC) signalling, a medium access control (MAC) control element (CE), and physical layer (PHY) signalling.

12. The method according to claim 10, wherein:
the BWP switching control indication comprises an indication of a plurality of switching times, each of the switching times associated with a start time of a period during which the infrastructure equipment may transmit the second service data in accordance with a schedule for the second service, wherein
controlling the receiver of the communications device to receive the signals within the second bandwidth part comprises controlling the receiver of the communications device to receive the signals within the second bandwidth part starting from the start time.

13. The method according to claim 9, the method further comprising:
receiving an indication of the schedule for the second service from the infrastructure equipment.

14. The method according to claim 10, wherein the BWP switching control indication comprises:
downlink control information transmitted by the infrastructure equipment using the communications resources within the first bandwidth part, the downlink control information comprising an identifier associated with the second service, wherein
controlling the receiver of the communications device to receive signals within the second bandwidth part is in response to receiving the downlink control information.

15. The method according to claim 14, wherein:
the downlink control information comprises an indication of the communications resources within the second bandwidth part used by the infrastructure equipment for the transmission of the second service data.

16. The method according to claim 14, wherein:
the identifier is a group radio network temporary identifier (RNTI).

17. The method according to claim 9, the method comprising:
after receiving the second service data,
controlling the receiver of the communications device to receive signals within the first bandwidth part, and
receiving further first service data transmitted by the infrastructure equipment using the communications resources within the first bandwidth part.

18. A communications device for operating in a wireless communications network, the communications device comprising:
a transmitter configured to transmit signals via a wireless access interface provided by an infrastructure equipment in a cell of the wireless communications network,
a receiver configured to receive signals via the wireless access interface, and
circuitry configured to control the transmitter and the receiver so that the communications device is operable
to transmit to the infrastructure equipment an indication of a bandwidth parts capability of the communications device,
to transmit to the infrastructure equipment a service preference indication (SPI), the SPI requesting that a first service continue to be provided to the communications device and that the first service and a second service be provided to the communications device in accordance with the bandwidth parts capability of the communications device, wherein the SPI includes an indication of a switching time required by the communications device to switch operation from a first bandwidth part of a carrier bandwidth of the wireless access interface to a second bandwidth part of the carrier bandwidth and a minimum size of a gap in a frequency domain separating the first bandwidth part and the second bandwidth part required for the communications device to operate on both bandwidth parts, to receive first service data associated with the first service, the first service data transmitted by the infrastructure equipment using communications resources within the first bandwidth part in accordance with the bandwidth parts capability, to control a receiver of the communications device to receive signals within the second bandwidth part of the carrier bandwidth in accordance with the bandwidth parts capability, and to receive second service data associated with the second service, the second service data transmitted by the infrastructure equipment using communications resources within the second bandwidth part, wherein the communications device is unable to receive and decode first data transmitted by the infrastructure equipment using the first bandwidth part and second data transmitted by the infrastructure equipment using the second bandwidth part, if the first data and the second data are transmitted by the infrastructure equipment simultaneously, and in response to the communications device being unable to receive and decode the first data transmitted and the second data transmitted simultaneously corresponding to an inability for simultaneous reception, the SPI communicates to the infrastructure equipment the inability for simultaneous reception on the first bandwidth part and the second bandwidth part, and the infrastructure equipment adapts scheduling of communications resources for at least one of the first service and the second service.

19. Infrastructure equipment for use in a wireless communications network, the infrastructure equipment providing a wireless access interface for communicating with a communications device in a cell, the infrastructure equipment comprising:

a transmitter configured to transmit signals to the communications device via the wireless access interface, a receiver configured to receive signals from the communications device, and circuitry configured to control the transmitter and the receiver so that the infrastructure equipment is operable to receive an indication of a bandwidth parts capability of the communications device transmitted by the communications device, and to receive a service preference indication (SPI) transmitted by the communications device, the SPI requesting that a first service continue to be provided to the communications device and that the first service and a second service be provided to the communications device in accordance with the bandwidth parts capability of the communications device, wherein the SPI includes an indication of a switching time required by the communications device to switch operation from a first bandwidth part of a carrier bandwidth of the wireless access interface provided by the infrastructure equipment to a second bandwidth part of the carrier bandwidth and a minimum size of a gap in a frequency domain separating the first bandwidth part and the second bandwidth part required for the communications device to operate on both bandwidth parts, in accordance with the bandwidth parts capability, the communications device is unable to receive, simultaneously, first data transmitted by the infrastructure equipment using the first bandwidth part and second data transmitted by the infrastructure equipment using the second bandwidth part of the carrier bandwidth, and in response to the communications device being unable to receive and decode the first data transmitted and the second data transmitted simultaneously corresponding to an inability for simultaneous reception, the SPI communicates to the infrastructure equipment the inability for simultaneous reception on the first bandwidth part and the second bandwidth part, and the infrastructure equipment adapts scheduling of communications resources for at least one of the first service and the second service.

* * * * *